United States Patent
Nemoto et al.

(10) Patent No.: US 6,462,930 B1
(45) Date of Patent: Oct. 8, 2002

(54) VACUUM VARIABLE CAPACITOR DEVICE

(75) Inventors: Tomofumi Nemoto; Toshimasa Fukai; Naoki Hayashi, all of Shizuoka (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 09/802,854

(22) Filed: Mar. 12, 2001

(30) Foreign Application Priority Data

Mar. 23, 2000 (JP) ........................................ 2000-081097

(51) Int. Cl.[7] .................................................. H01G 5/14
(52) U.S. Cl. ........................ 361/279; 361/280; 361/278
(58) Field of Search ................................ 361/277–281, 361/287, 289–297, 298.1–298.5, 299.1–299.5

(56) References Cited

U.S. PATENT DOCUMENTS 3,447,047 A * 5/1969 Lindsay ........................ 218/118
4,002,957 A * 1/1977 Weisbrod ..................... 361/271
4,177,495 A * 12/1979 Perret .......................... 361/278

FOREIGN PATENT DOCUMENTS

JP          11-273998          10/1999

* cited by examiner

*Primary Examiner*—Dean A. Reichard
*Assistant Examiner*—Eric W. Thomas
(74) *Attorney, Agent, or Firm*—Foley & Lardner

(57) ABSTRACT

An adjuster nut is rotatably supported to a vacuum container of a vacuum variable capacitor of a vacuum variable capacitor device. The adjuster nut has a nut portion, and a shank made of an insulating material. The shank has a first end integrated with the nut portion and a second end adapted to be directly coupled with a rotational shaft of a driving portion of the vacuum variable capacitor device. Another type of the adjuster nut has a deformable bellows, a nut portion, and a shank made of an insulating material. A second end of the nut portion is coupled with a first end of the bellows. The shank has a first end coupled with a second end of a bellows, and a second end adapted to be directly coupled with the rotational shaft of the driving portion of the vacuum variable capacitor device.

17 Claims, 5 Drawing Sheets

VACUUM VARIABLE CAPACITOR DEVICE

BACKGROUND OF THE INVENTION

The present invention relates to a vacuum variable capacitor device that is used for various applications such as an oscillator of a high power transmitter, a high frequency power source of a semiconductor manufacturing device, a tank circuit of an inductive heating device.

FIG. 3 and FIG. 4 show, respectively, a longitudinal cross section and a partly enlarged section of a vacuum variable capacitor, according to Japanese Patent Unexamined Publication (refereed to as "Kokai Koho" in Japanese) No. 11(1999)273998 which is an equivalent for Japanese Patent Application No. 10(1998)0074755.

There is provided an insulated cylinder 1 made of an insulating material such as ceramic and the like. As is seen in FIG. 3, the insulated cylinder 1 has first and second ends, which are respectively, joined with a first cylinder 2a and a second cylinder 2b, to thereby form a cylindrical shape. The first and second ends of the insulated cylinder 1 are made of copper, and are blocked by means of, respectively, an immovable end plate 3 and a movable end plate 4, to thereby form a vacuum container 5. Inside the immovable end plate 3, there are provided a plurality of first cylindrical electrode plates F than range from $F_1$ to $F_n$ having different diameters. The first cylindrical electrode plates $F_1$ to $F_n$ stand on the inside of the immovable end plate 3, and are concentrically disposed at regular radial intervals, to thereby form an immovable electrode 6.

There is provided a conductor 7 for mounting a movable electrode 8. The conductor 7 is so disposed in the vacuum container 5 as to oppose the immovable end plate 3. On a first side of the conductor 7 facing the immovable end plate 3, there are provided a plurality of second cylindrical electrode plates M that range from $M_1$ to $M_n$ having different diameters. The second cylindrical electrode plates $M_1$ to $M_n$ stand on the first side of the conductor 7, and are concentrically disposed at regular radial intervals, to thereby form the movable electrode 8. Each of the second cylindrical electrode plates ranging from $M_2$ to $M_n$ is put and ousted from between adjacent two of the first cylindrical electrode plates $F_1$ to $F_n$ (interdigitation), while each of the first cylindrical electrode plates ranging from $F_1$ to $F_{n-1}$ is put and ousted from between adjacent two of the second cylindrical electrode plates $M_1$ to $M_n$ (interdigitation). There is provided a center pin 9 standing at an internal center of the immovable end plate 3. There is provided a movable guide 10 which is cylindrical and functions as a guide. The movable guide 10 also functions as a lead. The movable guide 10 is so disposed as to penetrate through a center of the conductor 7. The center pin 9 is inserted into the movable guide 10 in a slidable manner.

There is provided a bellows 15 having a first end which is mounted to the movable guide 10. The bellows 15 is cylindrical and retractable. Moreover, the bellows 15 is used for maintaining a vacuum condition and for energizing. The bellows 15 further has a second end mounted to an internal face of the movable end plate 4. There is defined an opening 4a in the movable end plate 4. The opening 4a is disposed on a radial inner side of the second end of the bellows 15. There is provided a nut receptacle 11 which is cylindrical, and stands around the entire circumference of the opening 4a on the internal face of the movable end plate 4. There is formed a collar 11a at an internal end of the nut receptacle 11. There is provided a screw shaft 12 having a first end which is connected to the movable guide 10. The screw shaft 12 also has a second end projecting into the nut receptacle 11 through the collar 11a. There is provided an adjuster nut 13 having a first end which is so supported to the collar 11a by way of a bearing 16 as to rotate arbitrarily. The first end of the adjuster nut 13 defines a screw shaft opening 13a so that the adjuster nut 13 is screwed down on the screw shaft 12. The second end of the screw shaft 12 defines a coaxial screw opening 12a. With the screw opening 12a, the screw shaft 12 is screwed down on an adjuster screw 14 having a screw head 14a. Moreover, the adjuster nut 13 has a large opening 13b adjacent to the screw shaft opening 13a. The large diameter opening 13b is larger in diameter than the screw shaft opening 13a. There is defined a stage 13c between the screw shaft opening 13a and the large diameter opening 13b.

Described below is how to assuredly maintain a maximum electrostatic capacity of the vacuum variable capacitor having the constitution as mentioned above, and to facilitate adjustment of the maximum electrostatic capacity: At first, turn the adjuster nut 13 slightly clockwise (for right handed screw) so as to shift the screw shaft 12 slightly lower than a position X (not shown) of the maximum electrostatic capacity (at the position X, a lower end of the center pin 9 abuts on an upper end of the screw shaft 12), to thereby adjust the maximum electrostatic capacity to its predetermined value. The slight adjustment depends on the variation of the electrostatic capacity of the vacuum variable capacitors. Then, screw the adjuster screw 14 into the screw opening 12a to such an extent that the screw head 14a abuts on the stage 13c. Thereafter, fix the adjuster screw 14 to the screw shaft 12 by means of an adhesive and the like. Thereby, even if the adjuster nut 13 is likely to make a counterclockwise turn at the position X of the maximum electrostatic capacity, the screw head 14a of the adjuster screw 14 abuts on the stage 13c. Consequently, this can prevent the adjuster nut 13 from making the counterclockwise turn. Therefore, the screw shaft 12 cannot go up beyond the position X of the maximum electrostatic capacity. With this, the maximum electrostatic capacity can be assuredly maintained, and the adjustment of the maximum electrostatic capacity can be facilitated.

On the contrary, described below is how to arbitrarily variably adjust the electrostatic capacity of the vacuum variable capacitor having the constitution as mentioned above:

At first, turn the adjuster nut 13 so as to move the movable electrode 8 upward and downward by way of the screw shaft 12 and the movable guide 10. With this, a total area of the movable electrode 8 opposed to the immovable electrode 6 is varied, to thereby arbitrarily variably adjust the electrostatic capacity. With the center pin 9 and the movable guide 10 provided for constituting a guide mechanism, the movable electrode 8 can be moved stably, and a withstand voltage as well as the electrostatic capacity can show stabilized characteristics.

In the above mentioned related art, the movable guide 10 is integrated with a movable lead. Contrary to this, however, the movable guide 10 can be separated from the movable lead. Moreover, the movable guide 10 is to be electrically insulated from the center pin 9. The first end of the bellows 15 can be mounted to the conductor 7, instead of the movable guide 10.

When using the above vacuum variable capacitor for matching impedance of the semiconductor thin film manufacturing device, an operator needs to use a constitution shown in FIG. 5 for the following reason: Since a load changes continuously, it is necessary to carry out the impedance matching of the vacuum variable capacitor following the load change. More specifically, as is seen in FIG. 5, a vacuum variable capacitor 19 is mounted horizontally on a mounting base 17 by way of a pair of mounting plates 18, and a driving portion 21 is also mounted horizontally on the mounting base 17 by way of a mounting plate 20. A rotational shaft 22 of the driving portion 21 is coupled with the adjuster nut 13 by way of a coupling member 23. Driving the driving portion 21 allows the adjuster nut 13 to turn clockwise and counterclockwise, to thereby vary the electrostatic capacity of the vacuum variable capacitor 19.

FIG. 6 shows a general matching circuit using the vacuum variable capacitor 19 shown in FIG. 5. In the matching circuit, there are also provided a high frequency power source 24, a coil 25, and a load 26. It is necessary to insulate the immovable side from the movable side of the vacuum variable capacitor 19. Therefore, the vacuum variable capacitor device shown in FIG. 5 has a constitution in which each of the mounting plate 18 and the coupling member 23 is made of insulating material. For such insulation purpose, the coupling member 23 is continuously provided even when the coupling member 23 is not necessary. This ends up complicating the constitution of the vacuum variable capacitor device, and causing a backlash and the like. Thereby, it is difficult to control the driving portion 21.

SUMMARY OF THE INVENTION

It is therefore an object of the present invention to provide a vacuum variable capacitor device that does not require a coupling member, to thereby simplify a constitution of the vacuum variable capacitor device.

It is another object of the present invention to prevent any backlash from occurring, to thereby facilitate control of a driving portion of the vacuum variable capacitor device.

According to a first aspect of the present invention, there is provided an adjuster nut rotatably supported to a vacuum container of a vacuum variable capacitor of a vacuum variable capacitor device. The adjuster nut comprises a nut portion, and a shank made of an insulating material. The shank has a first end integrated with the nut portion and a second end adapted to be directly coupled with a rotational shaft of a driving portion of the vacuum variable capacitor device.

According to a second aspect of the present invention, there is provided an adjuster nut rotatably supported to a vacuum container of a vacuum variable capacitor of a vacuum variable capacitor device. The adjuster nut comprises a deformable bellows, a nut portion, and a shank. The bellows has a first end, and a second end opposite to the first end. The nut portion has a first end, and a second end coupled with the first end of the bellows. The shank which is made of an insulating material has a first end coupled with the second end of the bellows, and a second end adapted to be directly coupled with a rotational shaft of a driving portion of the vacuum variable capacitor device.

DETAILED DESCRIPTION OF THE PREFERRED EMBODIMENT

There is provided a vacuum variable capacitor device, according to a first preferred embodiment of the present invention.

Figure 1:
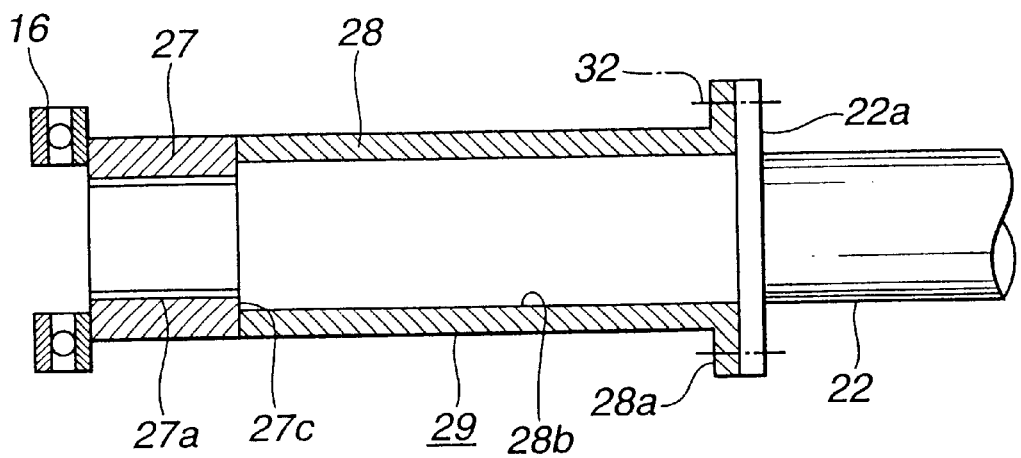
FIG. 1 is a longitudinal cross section of an adjuster nut 29 of a vacuum variable capacitor device, according to a first preferred embodiment of the present invention.
Figure 3:
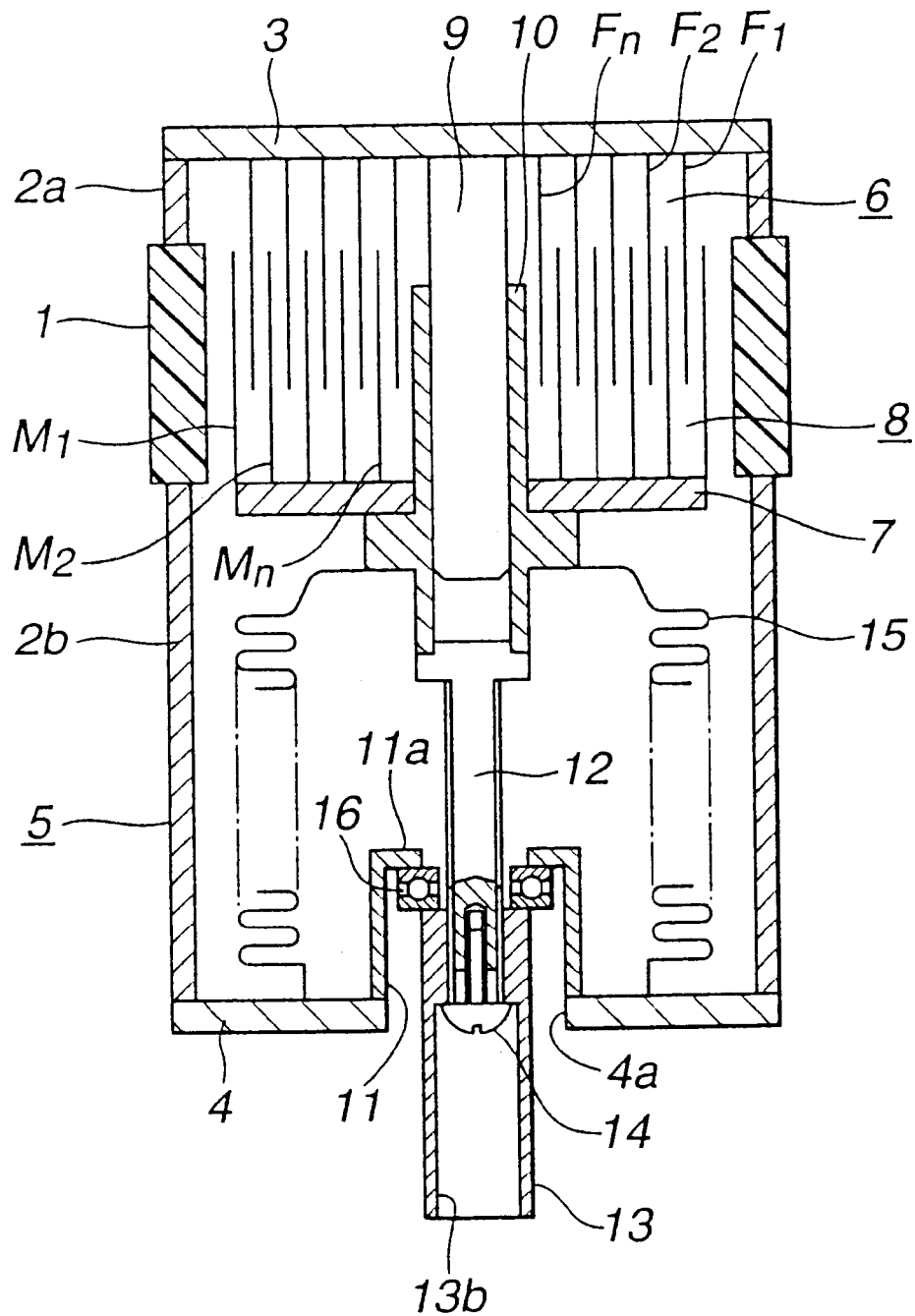
FIG. 3 is a longitudinal cross section of a vacuum variable capacitor, according to a prior art.
Figure 4:
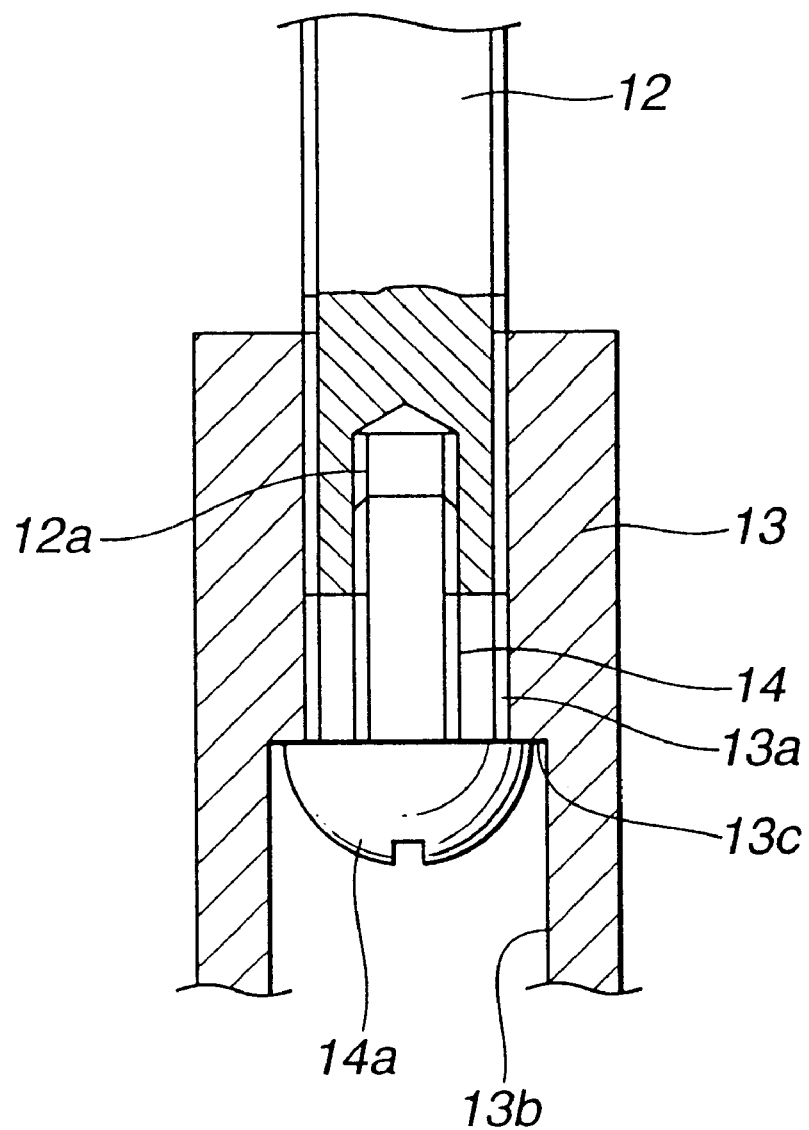
FIG. 4 is a partly enlarged view of the vacuum variable capacitor shown in FIG. 3.
Figure 5:
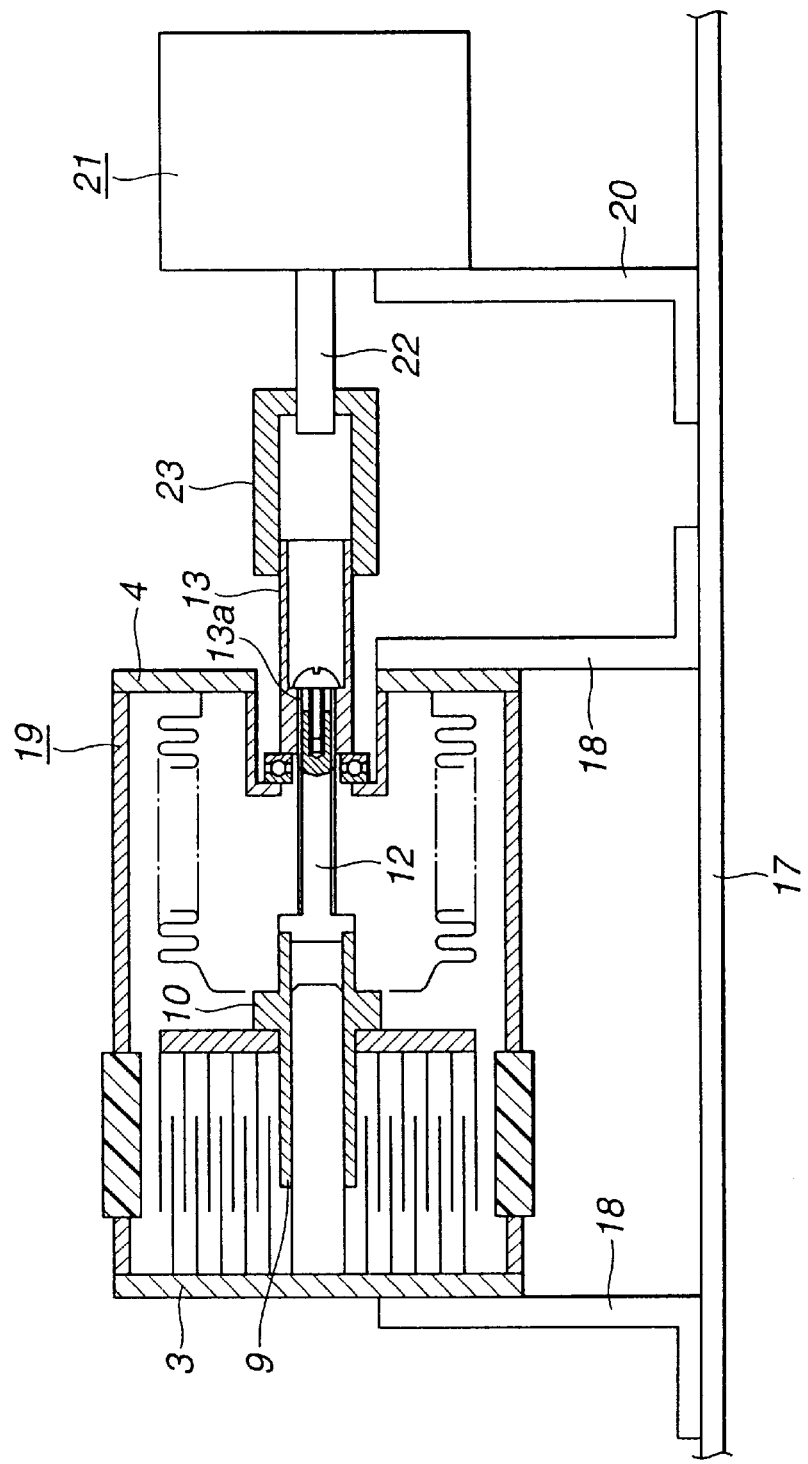
FIG. 5 is a longitudinal cross section of the vacuum variable capacitor device, according to the prior art.
Figure 6:
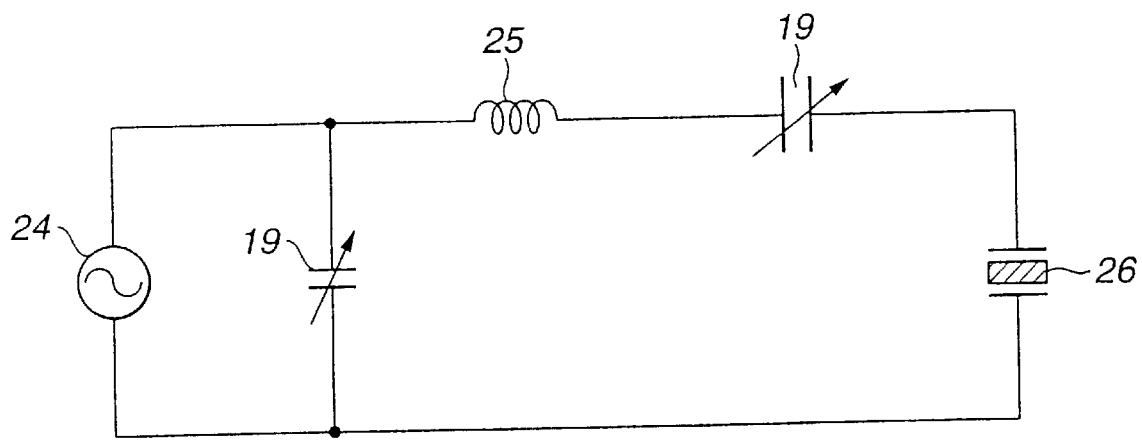
FIG. 6 is a schematic of a matching circuit using the vacuum variable capacitor.

FIG. 1 (also refer to FIGS. 3, 4, and 5) shows a longitudinal cross section of an adjuster nut 29 of the vacuum variable capacitor device. There is provided a nut portion 27 which is rotatably supported to a collar 11a of a nut receptacle 11 by way of a bearing 16, and defines a screw shaft opening 27a. With the screw shaft opening 27a, the nut portion 27 is screwed down on a screw shaft 12. There is provided a shank 28 having a first end which is integrated with the nut portion 27. The shank 28 is shaped into a cylinder, and is made of an insulating material such as an FRP (fiber reinforced plastic) or a polycarbonate. The shank 28 has a flange 28a at a second end thereof. The shank 28 defines an internal opening 28b extending from the first end to the second end of the shank 28. The screw shaft opening 27a of the nut portion 27 is smaller in diameter than the internal opening 28b of the shank 28 in such a manner as to form a stage 27c along a boundary therebetween. A rotational shaft 22 of a driving portion 21 has a flange 22a at a first end of the rotational shaft 22. The flange 22a is tightened and directly connected to the flange 28a by means of a bolt 32. It is the nut portion 27 and the shank 28 that constitute the adjuster nut 29. The other parts of the constitution of the vacuum variable capacitor device according to the first preferred embodiment are the same as those of the prior art.

According to the first preferred embodiment, the shank 28 is made of an insulating material. The rotational shaft 22 is directly connected to the shank 28. Thereby, there is no need for a coupling member 23 (see FIG. 5) that is made of an insulating material. The absence of the coupling member 23 leads to preferable features such as; a simplified constitution, no backlash attributable to the coupling member 23, and facilitating control of the driving portion 21. A driving force by the driving portion 21 is directly transmitted to the adjuster nut 29, to thereby improve efficiency. Moreover, varying a length of the shank 28 allows an insulation distance to become arbitrarily variable between the driving portion 21 and the vacuum variable capacitor 19.

There is provided a vacuum variable capacitor device, according to a second preferred embodiment of the present invention.

Figure 2:
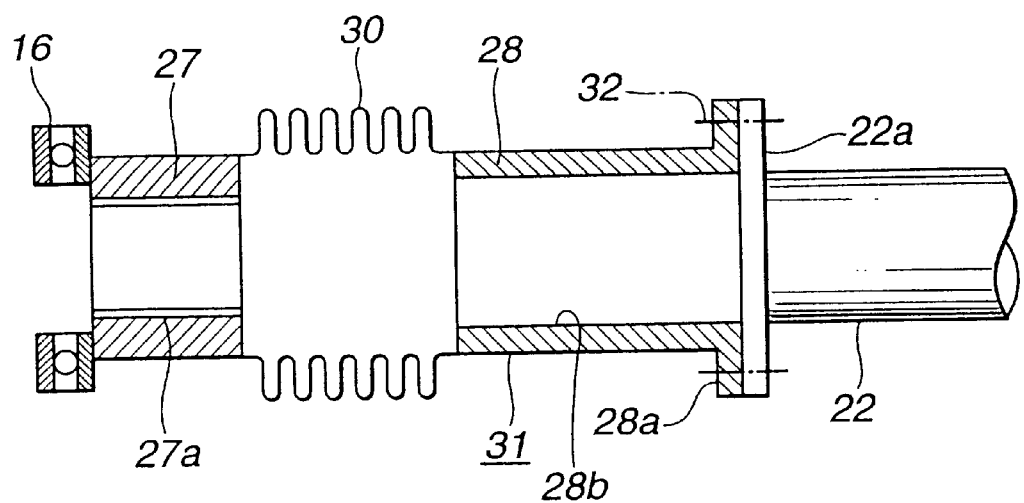
FIG. 2 is a longitudinal cross section of an adjuster nut 31 of the vacuum variable capacitor device, according to a second preferred embodiment of the present invention.

FIG. 2 shows a longitudinal cross section of an adjuster nut 31 of the vacuum variable capacitor device. There is provided a shank 28 connected to the nut portion 27 by way of a bellows 30. The adjuster nut 31 is constituted of the nut portion 27, the shank 28 and the bellows 30. The other parts of the constitution of the vacuum variable capacitor device according to the second preferred embodiment are the same as those of the prior art.

According to the second preferred embodiment, there is no need for the coupling member 23 (see FIG. 5) that is made of the insulating material. The absence of the coupling member 23, like the first preferred embodiment, leads to preferable features such as; a simplified constitution, no backlash attributable to the coupling member 23, and facilitating control of the driving portion 21. In case there should occur an axial deviation to the adjuster nut 31 relative to the rotational shaft 22, the bellows 30 is deformed so as to absorb the axial deviation. Thereby, a rotational torque of the adjuster nut 31 is prevented from increasing, and wears and deformations to the screw shaft 12 and the nut portion 27 are inhibited.

What is claimed is:

1. A vacuum variable capacitor device comprising:
    a vacuum container comprising:
        an insulated cylinder;
        a first end plate mounted at a first end of the insulated cylinder; and
        a second end plate mounted at a second end of the insulated cylinder opposite to the first end of the insulated cylinder;
    a first electrode formed on an internal surface of the first end plate, and comprising a first cylindrical electrode plate;
    a conductor disposed in the vacuum container in such a manner as to face the first end plate;
    a second electrode mounted to the conductor, and comprising a second cylindrical electrode plate on a first side of the conductor facing the first end plate;
    a guide mechanism disposed between the first end plate and the conductor in the vacuum container, so as to guide a movement of the conductor;
    a bellows having a first end mounted to the conductor and a second end mounted to the second end plate;
    a screw shaft having a first end mounted toward a second side of the conductor opposite to the first side of the conductor, and a second end adapted to be inserted in an opening defined in the second end plate, the opening being disposed on a radial inner side of the second end of the bellows;
    an adjuster nut rotatably supported to the second end plate, being screwed down on the screw shaft, and being insulative, the adjuster nut comprising a shank which is formed with a flange; and
    a driving portion having a rotational shaft formed with a flange which is directly coupled with the flange of the shank of the adjuster nut.

2. The vacuum variable capacitor device as claimed in claim 1, wherein the adjuster nut rotatably supported to the second end plate further comprises a nut portion screwed down on the screw shaft, wherein the shank is integrated with the nut portion and is made of an insulating material.

3. The vacuum variable capacitor device as claimed in claim 2, in which the shank is made of one material selected from the group consisting of a fiber reinforced plastic and a polycarbonate.

4. The vacuum variable capacitor device as claimed in claim 1, in which the first cylindrical electrode plate of the first electrode comprises a plurality of first cylindrical electrode plates having different diameters and standing concentrically on the internal surface of the first end plate, the first cylindrical electrode plates ranging from an innermost first cylindrical electrode plate to an outermost first cylindrical electrode plate, and in which the second cylindrical electrode plate of the second electrode comprises a plurality of second cylindrical electrode plates having different diameters and standing concentrically on the first side of the conductor, the second cylindrical electrode plates ranging from an innermost second cylindrical electrode plate to an outermost second cylindrical electrode plate.

5. The vacuum variable capacitor device as claimed in claim 4, in which each of the first cylindrical electrode plates ranging from the outermost to a second innermost is put and ousted from between adjacent two of the second cylindrical electrode plates in an interdigitating manner, and in which each of the second cylindrical electrode plates ranging from a second outermost to the innermost is put and ousted from between adjacent two of the first cylindrical electrode plates in an interdigitating manner.

6. The vacuum variable capacitor device as claimed in claim 1, in which the bellows is substantially in a form of a cylinder.

7. The vacuum variable capacitor device as claimed in claim 1, wherein the adjuster nut rotatably supported to the second end plate comprises:
    a nut portion screwed down on the screw shaft;
    the shank made of an insulating material; and
    a bellows disposed between the nut portion and the shank for connecting the nut portion with the shank.

8. A vacuum variable capacitor device comprising:
    a vacuum container comprising:
        an insulated cylinder;
        a first end plate mounted at a first end of the insulated cylinder; and
        a second end plate mounted at a second end of the insulated cylinder opposite to the first end of the insulated cylinder;
    a first electrode formed on an internal surface of the first end plate, and comprising a first cylindrical electrode plate;
    a conductor disposed in the vacuum container in such a manner as to face the first end plate;
    a second electrode mounted to the conductor, and comprising a second cylindrical electrode plate on a first side of the conductor facing the first end plate;
    a guide mechanism disposed between the first end plate and the conductor in the vacuum container, so as to guide a movement of the conductor;
    a bellows having a first end mounted to the conductor and a second end mounted to the second end plate;
    a screw shaft having a first end mounted toward a second side of the conductor opposite to the first side of the conductor, and a second end adapted to be inserted in an opening defined in the second end plate, the opening being disposed on a radial inner side of the second end of the bellows;
    an adjuster nut rotatably supported to the second end plate, being screwed down on the screw shaft, and being insulative, wherein the adjuster nut comprises:
        a nut portion screwed down on the screw shaft;
        a shank made of an insulating material, and directly coupled with the rotational shaft of the driving portion; and
        a bellows disposed between the nut portion and the shank for connecting the nut portion with the shank; and
    a driving portion having a rotational shaft which is directly coupled with the adjuster nut.

9. The vacuum variable capacitor device as claimed in claim 8, in which the shank is made of one material selected from the group consisting of a fiber reinforced plastic and a polycarbonate.

10. An adjuster nut rotatably supported to a vacuum container of a vacuum variable capacitor of a vacuum variable capacitor device, the adjuster nut comprising:

a nut portion; and a shank made of an insulating material, the shank having a first end integrated with the nut portion and a second end adapted to be directly coupled with a rotational shaft of a driving portion of the vacuum variable capacitor device, wherein the shank is made of one material selected from the group consisting of a fiber reinforced plastic and a polycarbonate, wherein the second end of the shank is formed with a flange that is coupled with a flange of the rotational shaft by means of a bolt, and wherein the shank defines an internal opening extending from the first end to the second end of the shank.

11. The adjuster nut as claimed in claim 10, in which the nut portion defines an internal threaded opening extending from a first end to a second end integrated with the first end of the shank, the internal threaded opening of the nut portion being smaller in diameter than the internal opening of the shank in such a manner as to form a stage along a boundary therebetween.

12. The adjuster nut as claimed in claim 11, in which the first end of the nut portion is fitted with a bearing.

13. An adjuster nut rotatably supported to a vacuum container of a vacuum variable capacitor of a vacuum variable capacitor device, the adjuster nut comprising:

a deformable bellows having a first end, and a second end opposite to the first end;

a nut portion having a first end, and a second end coupled with the first end of the bellows; and a shank made of an insulating material, the shank having a first end coupled with the second end of the bellows, and a second end adapted to be directly coupled with a rotational shaft of a driving portion of the vacuum variable capacitor device.

14. The adjuster nut as claimed in claim 13, in which the shank is made of one material selected from the group consisting of a fiber reinforced plastic and a polycarbonate.

15. The adjuster nut as claimed in claim 14, in which the second end of the shank is formed with a flange that is coupled with a flange of the rotational shaft by means of a bolt, and in which the shank defines an internal opening extending from the first end to the second end of the shank.

16. The adjuster nut as claimed in claim 15, in which the nut portion defines an internal threaded opening extending from the first end to the second end of the nut portion, the internal threaded opening of the nut portion being smaller in diameter than the internal opening of the shank.

17. The adjuster nut as claimed in claim 16, in which the first end of the nut portion is fitted with a bearing.

* * * * *